(12) United States Patent
Kruecker et al.

(10) Patent No.: US 12,471,863 B2
(45) Date of Patent: Nov. 18, 2025

(54) PATIENT MODEL ESTIMATION FOR INTERVENTIONS

(71) Applicant: KONINKLIJKE PHILIPS N.V., Eindhoven (NL)

(72) Inventors: Jochen Kruecker, Andover, MA (US); Grzegorz Andrzej Toporek, Cambridge, MA (US); Ashish Sattyavrat Panse, Burlington, MA (US); Molly Lara Flexman, Melrose, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 227 days.

(21) Appl. No.: 17/783,692

(22) PCT Filed: Dec. 11, 2020

(86) PCT No.: PCT/EP2020/085800
§ 371 (c)(1),
(2) Date: Jun. 9, 2022

(87) PCT Pub. No.: WO2021/116430
PCT Pub. Date: Jun. 17, 2021

(65) Prior Publication Data
US 2023/0020252 A1    Jan. 19, 2023

Related U.S. Application Data

(60) Provisional application No. 62/947,207, filed on Dec. 12, 2019.

(30) Foreign Application Priority Data

Jan. 7, 2020 (EP) .................................. 20150464

(51) Int. Cl.
*A61B 6/46*   (2024.01)
*A61B 6/00*   (2024.01)

(52) U.S. Cl.
CPC ............ *A61B 6/487* (2013.01); *A61B 6/4441* (2013.01); *A61B 6/469* (2013.01); *A61B 6/5211* (2013.01); *A61B 6/5294* (2013.01); *A61B 6/545* (2013.01)

(58) Field of Classification Search
CPC ....... A61B 6/4441; A61B 6/469; A61B 6/487; A61B 6/5211; A61B 6/5294; A61B 6/545
See application file for complete search history.

(56) References Cited

U.S. PATENT DOCUMENTS 10,331,850 B2   6/2019  Singh
10,529,088 B2 * 1/2020  Fine ....................... G16H 50/50
(Continued)

OTHER PUBLICATIONS

International Search Report and Written Opinion of PCT/EP2020/085800, dated Jan. 14, 2021.
(Continued)

*Primary Examiner* — Thomas R Artman

(57) ABSTRACT

System (SYS) and delated methods for supporting an imaging operation of an imaging apparatus (IA) capable of assuming different imaging geometries. The system comprises an input interface (IN) for receiving a current image acquired by the imaging apparatus (IA) of a current region of interest (ROI_1) at a current imaging geometry (p). A pre-trained machine learning component (MLC) computes output data that represents an imaging geometry change (Δp) for a next imaging geometry (p') in relation to a next region of interest (ROI_2). An output interface (OUT) outputs a specification of the imaging geometry change.

20 Claims, 5 Drawing Sheets

(56) References Cited

U.S. PATENT DOCUMENTS

| | | | | |
|---|---|---|---|---|
| 10,702,235 B2* | 7/2020 | Tang | .................... | A61B 6/545 |
| 10,786,220 B2* | 9/2020 | Lundt | .................... | A61B 6/545 |
| 10,856,832 B2* | 12/2020 | Quan | .................... | G16H 30/20 |
| 11,375,972 B2* | 7/2022 | Tang | .................... | G01N 23/046 |
| 11,564,653 B2* | 1/2023 | Quan | .................... | G06T 7/70 |
| 11,662,320 B2* | 5/2023 | Albarqouni | .............. | G06N 3/08 |
| | | | | 702/137 |
| 2016/0306924 A1* | 10/2016 | Singh | .................... | G06F 16/51 |
| 2017/0135654 A1* | 5/2017 | Van Daal | .............. | A61B 6/487 |
| 2018/0158209 A1 | 6/2018 | Fine | | |
| 2018/0353151 A1 | 12/2018 | Tang | | |
| 2019/0117183 A1* | 4/2019 | Lundt | .................... | A61B 6/545 |
| 2019/0313986 A1 | 10/2019 | Do | | |
| 2020/0330064 A1* | 10/2020 | Tang | .................... | G01N 23/046 |
| 2020/0378904 A1 | 12/2020 | Albarqouni | | |
| 2021/0068776 A1* | 3/2021 | Quan | .................... | G16H 50/20 |
| 2023/0020252 A1* | 1/2023 | Kruecker | .............. | A61B 6/5211 |
| 2023/0165556 A1* | 6/2023 | Quan | .................... | G16H 30/20 |
| | | | | 382/131 |

OTHER PUBLICATIONS

Mitchell, T.M. "Machine Learning", p. 2 Section 1.1. Mcraw-Hill, 1997.

Haiderbhai, M. et al "Automatic C-Arm Positioning using Multi-Functional User Interface", 2019 CMBEC42.

Zhong, Xia et al "A Machine Learning Pipeline for Internal Anatomical Landmark Embedding based on a Patient Surface Model", International Journal of Computer Assisted Radiology and Surgery, vol. 14, 2019, pp. 53-61.

De Silva, T. et al "C-Arm Positioning using Virtual Fluoroscopy for Image-Guided Surgery", Proceedings of SPIE Medical Imaging, 2017.

* cited by examiner

PATIENT MODEL ESTIMATION FOR INTERVENTIONS

CROSS-REFERENCE TO PRIOR APPLICATIONS

This application is the U.S. National Phase application under 35 U.S.C. § 371 of International Application No. PCT/EP2020/085800, filed on Dec. 11, 2020, which claim the benefit of U.S. Provisional Patent Application Ser. No. 62/947,207, filed on Dec. 12, 2019 and European Patent Application No. 20150464.4, filed on Jan. 7, 2020. These applications are hereby incorporated by reference herein.

FIELD OF THE INVENTION

The invention relates to a system for supporting image-based navigation, to a method for supporting image-based navigation, to a computer program element, and to a computer-readable medium.

BACKGROUND OF THE INVENTION

In certain medical interventions, such as percutaneous coronary intervention (PCI), a clinician sometimes needs to introduce into the patient one or more medical devices or tools, such as guide wires.

The intervention may be performed under X-ray imaging guidance where one or more mages are acquired by an imaging apparatus ("imager"), sometimes as a series to form a video feed, which is displayed real-time for the clinician (referred to herein as the "user") on a display device.

The displayed imagery allows the user to consider the lesion, organ, the introduced device/tool or, in general, a region of interest ("ROI"). For best diagnostic or therapeutic results, the ROI needs to be visualized in an appropriate pose which requires adapting an imaging geometry of the imager.

In the course of these at times difficult and demanding interventions, the clinician may need to switch from one ROI to another in which case the imaging geometry of the imager may need to be readapted. For example, the clinician may start treating a stenosis in one branch of the coronaries, and then switch to another branch where a bifurcation has to be treated. Or the treatment protocol may require switching from one organ to a completely different organ in a completely different part of the human body. For example, the user may wish to image the femoral artery at the groin to better introduce a catheter and then later one wishes to image the heart when treating a stenosis.

However, current interventional X-ray imaging systems have no "awareness" of the position of the patient on the imaging table, or of the body part currently imaged.

It is the responsibility of the user to move the examination ("exam") table, on which the patient lies during the intervention, and/or to move a gantry of the imager such as the C-arm so that the relevant region of interest ROI comes within the (possibly relatively small) field of view (FOV) of the imager's detector. In addition or instead, an appropriate C-arm angle may need to be adapted to obtain a clinically optimal image. Currently, these imaging angles have to be chosen manually by the operator, thus adding procedure time and X-ray dose.

Optical cameras are only of limited use for supporting image geometry adaptations as these cameras may not be able to detect the patient pose on the table because the patient is typically draped in sterile covers and only partially visible. This lack of "geometrical awareness" of the patient anatomy as present on the exam table can for example lead to undesired collisions of the moving C-arm with the patient.

Image geometry adaptations, in particular when required multiple times, are cumbersome and time consuming. For example, exam table or C-arm motion takes time and adds to the overall procedure duration. Often, X-ray imaging continues during table motion to monitor for the current FOV and to allow the operator to determine if the desired imaging ROI has been reached, adding to the overall dose exposure to user and patient as incurred during the procedure.

The manual or motor-assisted motion of the table needs to allow precise positioning, and thus slow motion, which makes it even more time consuming to perform larger table motions efficiently. Even if variable motion speeds are used (e.g. acceleration over time up to a maximum speed), the table motion process is not optimized because the system has still no awareness of which body part the user wishes to image next, or where that (next) region of interest is with respect to the imaging system's coordinate system.

In addition, imaging of different body parts may require different imaging settings ("EPX") for optimal dose and image quality. These settings have to be changed manually by the operator once the table/C-arm move is completed.

SUMMARY OF THE INVENTION

There may therefore be a need for an imaging support system to address at least one or more of the above mentioned shortcomings in current imaging systems.

The object of the present invention is solved by the subject matter of the independent claims where further embodiments are incorporated in the dependent claims. It should be noted that the following described aspect of the invention equally applies to the method for supporting image-based navigation, to the computer program element and to the computer readable medium.

According to a first aspect there is provided a system for supporting an imaging operation of an imaging apparatus capable of assuming different imaging geometries, comprising:

an input interface for receiving a current image acquired by the imaging apparatus of a current region of interest at a current imaging geometry;

a pre-trained machine learning component configured to compute output data that represents an imaging geometry change for a next imaging geometry in relation to a next region of interest; and an output interface for outputting a specification of the imaging geometry change.

In particular, the input imagery is currently acquired live imagery. The imaging geometry change may be explicitly provided and this is preferred, or may be provided implicitly by providing a specification of the new imaging geometry. In the latter case, a conversion operation may be required to obtain the imaging geometry change specification. The imaging geometry change estimate implicitly provides a pose estimation of the ROIs for the patient-as-on-table. The estimates may hence be used to optionally construct an anatomic model for the given patient that includes poses of the ROIs.

The specification may include, in the general sense, one or more data points such as coordinates, angular or translational, or a combination thereof, thus defining a trajectory for imaging geometry components of the imager. Changing the imaging geometry along this trajectory allows adapting the current imaging geometry into the second imaging geometry. There may be more than one such trajectories and indeed on occasion the trajectory is modified to avoid collisions with the patient.

The specification of the image geometry change may be represented implicitly by coordinates for the respective pose(s) itself of the one or more next ROIs relative to a coordinate system. The ROI pose coordinates can be converted into the image geometry change specification or into the new imaging geometry. The specification specifies how the current imaging geometry needs to changed so that the next image of a next ROI can be acquired at the computed pose.

Put differently, the proposed system, given a current ROI image, predicts the relative pose of this ROI in respect to a single or multiple other ROI (also referred to herein as "landmark"), from which a relative change of imaging geometry may be derived. In other words, every ROI that is imaged has a known relationship to an implicit reference coordinate system in patient space, and this implicit reference coordinate system is encoded in in a model of the machine learning component. The encoding may be given by network weights, such as in neural network model. This ROI coordinates may then be related to the imaging geometry changes such as in C-arm space in one embodiment. Alternatively, the ML model may encode imaging geometry changes directly without reference to ROI pose coordinates.

In embodiments, the system comprises a control module instructing, based on the specification, one or more actuators to cause the imaging apparatus to assume the next imaging geometry.

In embodiments, the system comprises a user interface configured to allow a user to specify the next region of interest.

In embodiments, the system comprises a graphics generator for generating a visual indication of the specification on a display device.

The visual indication may be suitable so as to guide a user to cause the imaging apparatus to assume the next imaging geometry.

In embodiments, the imaging geometry includes any one or more of: i) at least one pose of an X-ray source of the imaging apparatus ii) at least one pose of an examination table of the imaging apparatus, iii) a state of a collimator of the imaging apparatus, iv) a distance between a detector of the imaging apparatus and the X-ray source.

In embodiments, the machine learning component configured to compute an image acquisition setting of the imaging apparatus associated with the next region of interest and/or the imaging operation.

In embodiments, the machine learning component includes a neural network.

In embodiments, the neural network is a convolutional neural network. In alternative, or addition, the neural network includes a fully connected network.

In another aspect there is provided a system of training a machine learning model for supporting an imaging operation of an imaging apparatus capable of assuming different imaging geometries, the system configured to:
receive training input data including training imagery representing a region of interest and associated imaging geometry changes in relation to one or more other regions of interest;
apply the training data to the model to obtain training output data; and
adapt parameters of the model based on the training output data.

In embodiments, the model has neural network architecture.

In another aspect there is provided a method of supporting an imaging operation by an imaging apparatus capable of assuming different imaging geometries, comprising the steps of:
receiving a current image acquired by the imaging apparatus of a current region of interest at a current imaging geometry;
computing, based on a pre-trained machine learning component, output data that represents an imaging geometry change for a next imaging geometry in relation to a next region of interest; and
outputting a specification of the imaging geometry change.

In another aspect there is provided a method of training a machine learning component for supporting an imaging operation of an imaging apparatus capable of assuming different imaging geometries, comprising the steps of:
receiving training input data including training imagery representing a region of interest and associated imaging geometry changes in relation to one or more other regions of interest;
applying the training data to the model to obtain training output data; and
adapting parameters of the model based on the training output data.

In another aspect there is provided an image processing arrangement, comprising:
a system of any one of the above mentioned embodiments and the imaging apparatus.

In another aspect there is provided a computer program element, which, when being executed by at least one processing unit, is adapted to cause the processing unit to perform the method as per any one of the above described embodiments.

In another aspect there is provided a computer readable medium having stored thereon the program element r the pre-trained machine learning component as used in the system as mentioned above in any one of the embodiments.

What is proposed herein is a system and method to learn a model of the patient's pose on the examination table, and hence of the required imaging geometry changes, based on one or more training patient-on-table X-ray images drawn from of a patient population. The training may be refined by learning from imagery in conjunction with contextual image or non-image data. The contextual data may include prior patient information derived from the hospital's IT systems (eg, Radiology Information Systems (RIS), Electronic Medical Records (EMR), and/or Picture Archiving and Communication Systems (PACS)). The so trained model is then utilized to assist or automate table/C-arm motion and/or angulation, and to automatically optimize EPX (or other) settings for the current body part to be imaged.

"Imaging geometry": in fluoroscopy or other X-ray or non-X-ray imaging modalities, imaging geometry may be determined by one or more (in any combination) or all of: angulation angle ("angulation"), rotation angle, translation etc. In general, the imaging geometry relates to a geometrical configuration of the imager. Imaging geometry pertains to any setting or configuration that changes position and/or orientation of the optical axis, the imaginary axis that connects X-ray source and X-ray detector and/or setting/ configuration of the imaging modality/apparatus that otherwise influences spatially the imaging FOV, in particular relative to the imaged subject, such as collimator settings. etc. Imaging geometry may also include the SID (sourceto-detector distance), the imaging geometry thus (inherently) determining magnification.

"User": as used herein, is someone who operates the imaging apparatus.

"patient/object: may be human, animal or plant, microbiological (eg, in microscopic imaging), etc. but may also relate to inanimate "objects" such as in baggage screening, non-destructive material testing, etc.

In general, a "machine learning component" is a computerized arrangement that implements, or facilitates implementation, of a "machine learning" ("ML") algorithm. The machine learning model may be based on a ML "model". The ML component is configured to perform a task. In an ML algorithm, task performance improves measurably after having provided the arrangement with more and more training data. The model is adapted based on the training data. The performance may be measured by objective tests when feeding the trained model with test data. The performance may be defined by requiring a certain error rate to be achieved for the given test data. See T. M. Mitchell, "*Machine Learning*", page 2, section 1.1, McGraw-Hill, 1997. The task of main interest herein is navigation support for imaging, in particular the estimation of an imaging geometry change.

"Pose": refers to either one or both of location and orientation.

BRIEF DESCRIPTION OF THE DRAWINGS

Exemplary embodiments of the invention will now be described with reference to the following drawings, which are not to scale, wherein.

DETAILED DESCRIPTION OF EMBODIMENTS

Figure 1:
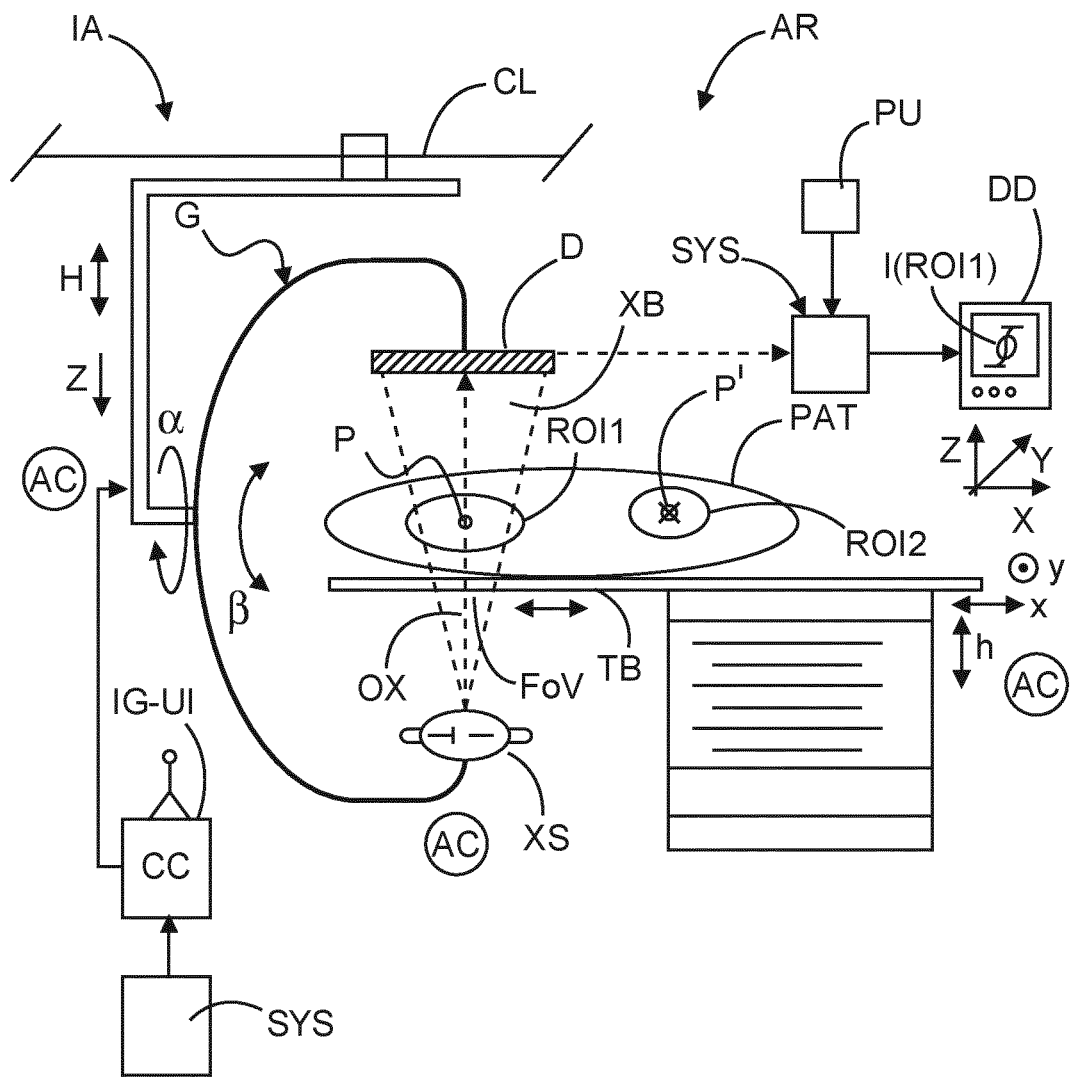
FIG. 1 is a block diagram of an imaging arrangement including an X-ray imaging apparatus.

With reference to FIG. 1 there is shown a schematic diagram of an arrangement AR for image-based support of navigation, for use preferably in the context of a medical intervention.

The arrangement AR comprises an imaging apparatus IA, in particular an x-ray imaging apparatus, operable by a user to obtain x-ray imagery $I_i$ of internal structures of a patient at a region of interest ROI_1. The region of interest ROI_1 may be the human heart, the lungs or another organ or groups of organs.

The imagery $I_i$, sometimes referred to herein as a sequence of frames, may be displayed in real-time as a motion picture or video feed on a display device DD to the user, or may be displayed singly as a still image, as desired.

The imaging arrangement AR further comprises an image processing system SYS to assist a user in adapting a current imaging geometry (for imaging a current ROI_1), to a new imaging geometry to image a new ROI_2.

As mentioned, the imaging apparatus AI and the imaging processing system SYS are mainly envisaged herein in embodiments to support medical interventions such as percutaneous coronary interventions (PCI). Other medical interventions, not necessarily performed in relation to the human or animal heart, are also envisaged, and so are non-medical applications such as image-based support for examinations and works carried out in inaccessible caving or plumbing systems, or examination of technical equipment such as engines and other complex machinery that cannot be directly inspected by the unaided eye, but require imaging equipment to make occluded regions of interest accessible through a video feed to visual inspection.

Referring now first in more detail to the imaging apparatus IA, this may be arranged as shown in the exemplary embodiment in FIG. 1 as an imaging apparatus of the C- or U-arm type. In the embodiment of FIG. 1, the C-arm system IA is ceiling CL mounted but this may not be necessarily so in all embodiments. Alternatively, the imaging apparatus IA is floor mounted, or mounted on a stand. etc. In further alternative, the imaging apparatus may be mobile, such as wheeled or track-mounted.

The X-ray imaging apparatus includes an x-ray detector D and an x-ray source XS. Broadly, in embodiments, but not necessarily all embodiments, the imaging apparatus comprises a gantry G which carries the x-ray detector D and the x-ray source XS, such as an x-ray tube. The x-ray detector and the x-ray source XS are arranged on the gantry G in opposed spatial relationship to form an examination region between the x-ray source and the x-ray detector. It is in this examination region that the patient PAT is situated so that the region of interest is positioned roughly at an iso-center of the IS imaging apparatus. The patient may lie on an examination table TB during the imaging. The table TB may be adjusted in height H, may be translatable along X, or Y, or both X and Y axis, and may also be tiltable in embodiments about a one or two tilt axis.

During the imaging procedure, the x-ray source XS is energized by applying a cathode current and a voltage across an anode and the cathode to produce an x-ray beam XB that issues forth from a focal spot of the anode. The beam exits the x-ray source, passes through the examination region, and hence through patient tissue at and around the region of interest, to then impinge on an x-ray sensitive surface of the x-ray detector D. The x-ray sensitive surface of detector D may comprise pixel elements that convert the impinging x-radiation into intensity values. The intensity values may vary from location to location, the variation being caused by differential attenuation of the x-ray beam due to tissue or tissue types having locally different material densities.

The intensity values so recorded at the detector XS may be mapped into image values according to a color or grey value palette to form a projection image ("frame"). Acquisition circuitry operates to capture in this manner at a suitable frame rate a sequence of different projection images at different instances during the imaging procedure. Exemplary frame rates envisaged herein are 20-30 fps. For instance, in fluoroscopy, as the main modality envisaged herein, intensity values may be mapped on a range of values ranging from black through grey values to white, with image values the darker the lower the intensity values. Other mapping schemes may be used, such as a reverse mapping, where lower intensity values are mapped to lighter image values such as is commonly used in radiography. Still other mapping schemes may be used instead.

The spatial width of the primary x-ray beam defines the field of view FoV of the imager IA. Objects that reside or extend into the field of view, and hence into the x-ray beam, will modify the intensity with which the x-ray is detected locally at the detector. The field of view may be changed by user request or automatically by adapting the imager IA's imaging geometry such as by moving the X-ray source, moving the patient, or by enlarging or restricting the beam width by using a collimator (not shown), or a combination of all or any subset of the foregoing components. The system SYS is configured to support imaging geometry changes as will be described more fully further below.

The X-ray detector may be arranged as a digital flat-panel detector communicatively coupled to the display device DD. The flat-panel detector D may be of the direct conversion or indirect conversion type. In an alternative embodiment, the imaging detector may be arranged as an image intensifier coupled through a video camera to the display device.

Although the contrast conferring mechanism of the projection imagery mainly envisaged herein is attenuation, other imaging techniques that exploit, in addition or instead, other contrast mechanisms are not excluded herein such as phase contrast and/or dark-field imaging. In the latter two cases, the imaging apparatus may include additional components, such as an interferometer or other.

The imaging apparatus includes a control console CC through which the user can determine when to start and stop the imaging procedure, in particular when to energize the x-ray source XS. A pedal may be coupled to the console as a user interface to control energizing or de-energizing the x-ray source or to operate a grid switch to halt or resume exposure to the X-ray beam.

The main propagation direction of the primary x-ray beam (leaving aside scattered radiation) is defined by the optical axis OX which is an imaginary line that runs from the focal spot (not shown) of the x-ray source to a center portion of the x-radiation sensitive surface of the x-ray detector D. The optical axis defines the spatial projection direction.

In order to better support the user in navigation, a position or spatial orientation of the optical axis, and hence of the projection direction, may be changed on user request. This can be achieved in one embodiment by arranging the gantry to be rotatable around one, or preferably two, respective axes perpendicular to each other. Having two such rotational axes allows for 2 degrees of freedom for changing the optical axis. For instance, in one geometry one of the rotation axis extends into the drawing plane of FIG. 1 and allows the optical axis to be rotated around an angle β. The other rotation axis is parallel to the drawing plane of FIG. 1 and allows changing the orientation around another angle α, independent of β, as schematically shown in FIG. 1. By convention, the axis for α defines "the rotation" whilst the axis for β defines "the angulation".

Optionally, it is also the height of the gantry itself that may be changed as indicated by double arrow H in FIG. 1. In addition, the optical axis OX may be translated by moving the gantry accordingly along a line. Position and orientation of the optical axis may be referred to herein to at least partly define the imaging geometry. In other words, the imaging apparatus envisaged herein in embodiments allows the user to change the imaging geometry. The change of the imaging geometry may be requested through the user operating a joy-stick or other suitable user interface IG-UI through which an imaging geometry change can be requested. The user interface IG-UI is coupled to the control console CC. The imaging geometry change may be requested fully automatically by the proposed computerized imaging support system SYS without any user involvement. Alternatively or as an additional option, the computerized imaging support system SYS may allow users to change the imaging geometry by themselves through the user interface IG-UI, but the imaging support system SYS engages usefully, eg guides the user towards the imaging geometry. The guiding operation may be implemented purely through visual clues, or in addition or instead, actively, eg, mechanically by haptic stimuli or otherwise as will be explained later in more detail.

The requesting of the change in imaging geometry may include causing control signals to be applied to suitable actuators ACO arranged at the imaging apparatus such as at any one or more of the gantry, the table TB collimator COL (if present), etc. The actuators AC act in response to the control signals to change the imaging geometry. The actuators AC are either powered by a power source or are powered manually by the user through hand wheel, levers, etc or other devices. The actuators AC are either purely automatic or a hybrid, or semi-automatic. In the semi-automatic user operates user interfaces such as a joystick or other control device, but may be assisted by a servo-motor or similar to effect the imaging geometry change.

The actuators are encoded or not. If they are encoded, they may include linear and or angular encoder such as potentiometers, or others. Thanks to the encoders, the image geometry change effected by one or more actuators is trackable, that is, is mappable to numerical coordinates that vary with the imaging geometry change.

Other options to change the imaging geometry may include changing the detector-x-ray source distance and/or changing the distance between the region of interest and the x-ray detector and hence the x-ray source. The latter change may be effected by changing the height h of the examination table TB on which the patient lies. Changing height h and/or the source-detector distance may amount to a rescaling of the image at a certain magnification factor. Yet other options to change the imaging geometry may include operation of the collimator (not shown) to restrict or enlarge the cross section, in shape or size, of the x-ray beam to change the field of view ("FoV"). Yet another option to change the imaging geometry may include translating the patient table TB in a plane parallel to the surface of the table in X, Y direction, one direction being parallel to the drawing plane of FIG. 1 and the other extending into the image plane. The table may also be tiltable around one or two axes. Components of the imaging apparatus that take part in the imaging geometry change may be referred to herein generally as imaging geometry components and include in particular any one, more than one, or all of: the source XS, the gantry, the detector, a collimator (if any), the table etc.

The angular values α, β mentioned above may be referred to herein collectively as the angular imaging geometry parameter $p_\omega$. The imaging geometry in respect of the table TB, that is translations along x, y or x and y, may be referred to herein as the translational imaging geometry parameters $p_T$. It will be understood that the angular imaging geometry parameter $p_\omega$ may also include other such parameters in relation to settings of other imaging geometry components such as table tilting and/or translational imaging geometry parameter $p_T$ may further include settings such as collimators openings or translational settings of the C-arm such as height H adaptations (eg, translations along Z axis) or translations of other components that determine the imaging geometry. In sum, the imaging geometry may thus be formalized as a, in general high dimensional, vector $\vec{P}=(p_\omega, p_T)$. Each imaging geometry is a pose and it relates to a pose of the respective ROI that can be imaged as the respective imaging geometry. Imaging geometry changes may include changes only in translational imaging geometry parameters $p_T$, or only changes in the angular imaging geometry parameters $p_\omega$, or in both, in $p_\omega$ and $p_T$, in particular in some simpler embodiments, changes in imaging geometry relates only to motion in x, or y or both x and y direction of the table TB or C-arm gantry. Angular changes, if any, are done manually by the user. In other embodiments, there are changes envisaged in both, $p_\omega$ and $p_T$ or only in $p_\omega$, as required. In will be understood that the above mentioned definitions in relation to imaging geometry components/parameters are in the context of C-arm X-ray imaging, the present disclosure is not confined to this modality and the principles as explained herein can be applied to any other imaging apparatus that admits imaging geometry changes. The parameterization in terms of $p_\omega$, $p_T$ will be different of course.

In general, a change in imaging geometry changes the spatial relationship between the x-ray source and/or detector relative to the region of interest. In addition or instead, the field of view may be changed by collimator action or by moving the patient for instance by table TB translation as described.

In a typical imaging protocol, the user may energize the x-ray source and acquire one image or a sequence of images I(ROI_1) of a first region of interest ROI_1 at a first imaging geometry. The acquired one (or more) frames is/are displayed as a video feed or as still imagery on the display device DD. The user may then request the imaging to stop, that is the x-ray source is de-energized or the x-ray beam is otherwise disabled, for instance by collimator or grid switch action.

The imaging protocol may then require acquiring imagery of a second region of interest ROI_2 at a different imaging geometry. In fact, certain imaging protocols such as PCI or others may require the user to visit a number (more than two) different ROIs in a certain sequence and to acquire a respective image, or sequence of images, at each of the ROIs at different respective imaging geometries. In particular when such complex imaging protocols are called for, the computerized navigation support system SYS as proposed herein helps the user to quickly and reliably find those ROIs in sequence by automatically, or at least semi-automatically realize the different imaging geometries when visiting the sequence of ROI_1 through ROI_K. K>1. Alternatively, or in addition, the system SYS assist the user in operating he imaging geometry user interface of the imaging apparatus by visual clues how the imaging geometry should be changed or by mechanical engagement with the user interface to promote correct user interface operation.

The basic operation of the proposed navigational assistant system SYS can be illustrated with reference to FIG. 2 where a schematic drawing of a "virtual" model M of a patient is shown in plan view.

The crosses indicate different regions of interest for certain interventions, such as the location of the neck arteries A, of the heart H, the kidneys L and the femoral access point R. In more, in the situation shown in FIG. 2 it is currently the femoral access site R as the first or current first region of interest ROI_1 that is imaged to acquire a first or current image I(ROI_1) at the correct imaging geometry. Next, the protocol may require imaging the heart H which would then require an imaging geometry change. This imaging geometry change may be conceptualized, and in fact defined, as a geometrical transformation that transforms the current geometry at ROI_1 to an updated imaging geometry required to properly imaging the heart at ROI_2=H.

This transformation from R to H, or more formally $T_{R,H}$, represents a change of imaging geometries which can be realized by angular or translational motion, or a combination of both. Specially, the transformation is realized or caused by one or more of imager IA's actuators AC that drive the respective imaging geometry components, such as translation of the examination table and/or rotation/angulation of the C-arm. The proposed system SYS is configured in embodiments to control the actuator(s) AC accordingly.

It is understood that some imaging geometry changes involve moving both, the patient table TB and the gantry G (eg. C-arm of an interventional X-ray imaging system) Both motions are actuated and encoded in embodiments. The relative poses of gantry C and table TB determine at least in part or fully the current imaging geometry for a ROI_1. So a change in imaging geometry incudes in particular relative changes where one or more imaging geometry components are actuated to change their pose.

For example, a relative motion between C-arm G and exam table TB may imply that it is only the table TB, or only the C-arm G, or both components are moved to change their relative pose, eg positon.

More formally, let $T_T$ be the 3D pose transformation of the table in a fixed world reference coordinate system, and $T_C$ be the 3D pose transformation of the C-arm in the same fixed reference coordinate system. Then the relative motion (or pose transformation) is:

$$T_R = T_C^{-1} \cdot T_T \quad (1)$$

Expression (1) describes the relative motion of the table to the C-arm, where the "$^{-1}$" indicates transformation inversion, and "·" indicates the multiplication/concatenation of transformations. In the following, each imaging geometry transformation is describable as a single or a composition of two (such as in (1)) or more transformation matrices with entries that relate to a common fixed world coordinate system, each matrix Tj representing a pose change of the relevant imaging geometry component j.

It will be understood that the model M as envisaged herein does not explicitly encode each and every ROI location or, more generally, pose. This is because there are no absolute values to describe this as the exact poses of the respective regions of interest may be different from patient to patient, and this in turn directly implies variations on how the imaging geometry needs to be changed. It is instead proposed herein to implement the model M as a machine learning model as part of a machine learning component MLC that is trained on a training data that includes patient imagery from historic cases or imagery that is synthetically generated. Parameters of the machine learning model M are then adapted based on the training data. The parameters so adapted then collectively and implicitly encode the mutual space relationships between the regions of interest for a population of patients as a whole rather than for a single patient. A suitable machine learning model proposed herein and a method to train same based on training data will be explained more fully below at FIGS. 4A, B and FIG. 5B.

Turning now first to the operation of the image processing system SYS, this will now be explained in more detail with reference to the block diagram of FIG. 3. Broadly, the navigation support system SYS is configured to perform an imaging geometry change or is configured to assist the user in realizing the correct imaging geometry.

The imaging supporting navigation system SYS is computerized. It may be implemented on a single or multiple data processing systems PU. The system SYS is either integrated into the imaging apparatus IA or is otherwise communicatively coupled, in a wired or wireless manner, with the imaging apparatus IA that supplies the frames $I_t$.

The system SYS may be arranged as one or more software modules suitably linked and run on the one more processing units PU. Alternatively, the imaging processing system SYS may be arranged in hardware as a suitably configured micro-controller or micro-processor. In the alternative still, the system SYS is implemented in both, hard- and software. The system may be partly or fully implemented as a micro-controller, optionally fully integrated into the imaging apparatus IA. Some or more of the following described components of the image processing system SYS, in particular the machine leaning component MLC, may reside in one or more memories SM suitably communicatively coupled. The data processing system PU may be a general purpose computing device suitably programmed. The processing unit may include a graphical processing system (GPU) to achieve speedy computation.

Figure 3:
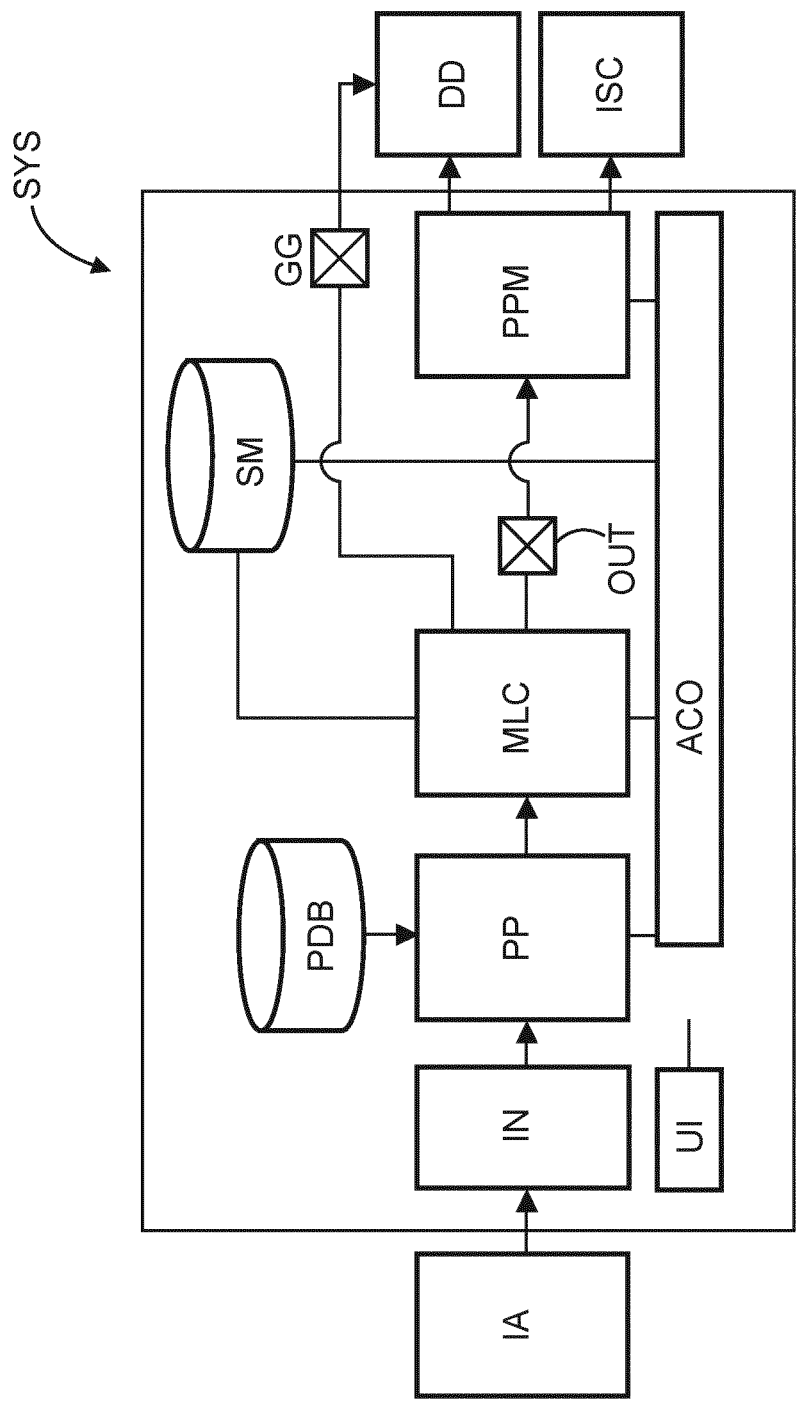
FIG. 3 is a schematic block diagram of a computer-implemented navigation system for imaging support.

With continued, and more detailed, reference to FIG. 3, this shows a schematic block diagram of components of the proposed navigation support system SYS. The system SYS includes the machine learning component MLC. The machine learning component is, for now, assumed to have been fully trained on suitable training data. The system SYS will now hence be explained when operating in "deployment phase", that is, after the "learning/training phase". It should be noted, however, that the training of the machine learning component may not necessarily be a one off operation but the system can be made to learn from new data especially when it is found to perform poorly for some reason. These repeat learning phases (with training data different than before) allow, for instance, adjusting the system SYS to particular characteristics of a patient population at a medical site for instance.

In the now described deployment phase, a patient PAT is positioned on the exam table TB and the first/or next image I(ROI_1) is obtained of interest ROI_1 by operating the imager IA at a first imaging geometry. This first/current image I(ROI_1) is received at input port IN of the navigation support system SYS. The image may be pre-processed by an optional pre-processor module PP. The pre-processing may include any one or more of cropping, re-sampling, scaling, histogram normalization and other normalization or standardization steps, as well various types of data augmentations (rotation, translation, scaling, and addition of anatomy or interventional device obtained from simulations). Optionally, a vector $a_k$ with additional patient bio-characteristic data (such as height, weight, BMI, age, gender, ethnicity) is also pre-processed (e.g. normalized, embedded) and provided to the pre-trained MLC jointly with the current live imaging data $I_k$. Although using live image data is preferred, alternatively or in addition, auxiliary image data may be used, such as pre-operative scout image(s), full body CT imagery, MRI imagery, ultrasound imagery, or imagery of other modalities.

Operation of the system SYS is under the control and coordination of an Application Controller ACO. The possibly pre-processed live input image (a single one may be enough) along with the optional (possibly pre-processed) context data $a_k$ are provided as live input to the machine learning component MLC. The MLC including the trained parameters (such as NN weights), is held in one or more storage media SM. Under control of the Application Controller, the MLC is used to compute, based on the live input, an estimated, preferably normalized, pose vector $p_k$ that defines the required imaging geometry change for a new ROI/landmark (ROI_2) to be imaged. A response time of the machine learning component MLC when estimating the imaging geometry change has been observed to be in the region of a fraction of a second such as milliseconds, particular if one or more GPUs are used.

An imaging system controller ISC is used to convert the normalized imaging geometry change vector $p_k$ into instructions or control signals for one or more actuators AC of the relevant imaging geometry ("IG") components. For instance, the estimated normalized position vector $p_k$ may be converted into relative table motion transform $T_R,i$ from current ROI_1=H to one or several landmarks ROI_2=i. The control signal may specify for example the relative table motion to correctly image the target ROI_2. The actuator control signal determines in phase space a trajectory. This trajectory is usually the shortest possible to have the imager quickly transform according to the new imaging geometry. On occasion, the shortest possible trajectory may result in patient collision. To avoid this, the imaging system preferably includes a collision avoidance system ("CAS") with one or more distance/proximity sensors (such as of the capacitive type) suitably arranged on the movable IG components. The imaging control system may interface with the CAS to modify the estimated trajectory to avoid collision events. Whilst the proposed system SYS can be used with such sensor-based CAS, distance-independent CASs are also envisaged, thanks to the anatomy awareness of the system SYS. This collision-avoidance "bias" or property can be achieved in the training phase by providing imaging geometry changes as targets that are designed to avoid collisions in the first place.

The system may include one more user Interfaces UI, graphical or not, that is/are configured to allow user to define a target ROI/target anatomy to be imaged next (e.g., i="H (eart)"). Specially, a graphical rendering of the model M and/or the landmarks i can allow efficient selection of the next/desired imaging location by user through voice-control or touch-screen action, or other. Once the user has specified the target i, the MLC returns the estimated IG change for target region ROI=i. In other embodiments, the MLC computes at once all IG changes for all other ROI given the current one. But only when the user specifies the next ROI_2=i by operation of the input user interface, is the relevant IG information displayed or forwarded to the imaging system controller ISC.

In embodiments, the MLC may not explicitly and natively provide the imaging geometry change vector $p_k$, but may provide its output in terms of a pose specification of the target imaging geometry itself for the next region of interest ROI_2. In this case, the system SYS may comprise a pose processing module PPM that computes the said IG change Δp given the current IG p and the estimated new IG p' as Δp=p−p'. For example, based on the current imaging geometry p (for example, a current table position and C-arm position/angulation and/or rotation), and the estimated new imaging geometry p' (which relates to a patient and landmark poses), the required imaging geometry change Δp is computed by the pose processing module PPM. In addition, the pose processing module PPM may be configured to convert ROI pose coordinates into imaging geometry parameters, in case the MLC supplies its output not directly in terms of imaging geometry parameters but in terms of pose coordinates of the ROI(s). In this case, the pose processing module PPM is used to convert the (normalized) pose (in particular position) vector p as supplied by the MLC into an absolute or relative imaging geometry change, such a required table motion transform(s) $T_{R,i}$ to one or several ROIs i.

By way of example, the user interface UI may be used by the user to define a target ROI_2/target anatomy to be imaged next (e.g., "Heart") given a current image of a current ROI_1. Based on the current table and/or C-arm positions (or poses), and the estimated patient and landmark ROI poses, the relative table motion/and or C-arm G rotation and/or angulation required to image the target ROI is computed in the pose processing module PPM.

The estimated imaging geometry change vector $p_k$ and/or target pose may be visualized by a graphics generator GG in graphically and/or in text form on a display device DD. The displayed information may guide the user to the next table position for example.

In some embodiments, the imaging system controller ISC realizes the imaging geometry change fully automatically without further user involvement by controlling the relevant actuators AC. For example, the table TB motion and/or C-arm rotation/angulation can be effected without user interaction. The imaging system controller ISC may control in other embodiments the speed of table/C-arm motion based on the estimated distance to the target, allowing rapid motion over larger distances and slower motion for fine-tuning the position closer to the target ROI_2.

In addition, or instead, passive or semi-automatic application of the imaging system controller ISC to assist in the IG change are also envisaged herein, and so are the effecting of other actions that are beneficial for efficient imaging of the next target ROI_2.

In a passive embodiment, the graphics display generated by the graphics generator GG on the display device, may be configured to indicate the current and target coordinates of the table and/or the C-arm. The display can also graphically show the current position of the table, C-arm, and estimated patient pose, as well as the target ROI and corresponding target table/C-arm position. The indications may be displayed in text/numerical form or by directional or rotational graphical widgets such as arrows etc. The displayed navigational indications may be updated as the user and/or the system controls the motion of the IG components such as table and/or C-arm.

In a further passive embodiment, additional visual or audio feedback can be provided related to the remaining distance from the target ROI. An intensity or other quality of the visual or audio feedback may be modulated in proportion to the remaining distance and/or in proportion to a deviation from the estimated target IG.

Semi-automatic embodiment of the imaging system controller ISC may include engaging with the circuitry of the IG changing user interface IG-UI to modulate mechanical or other effects that guide or urge the user to realize the estimated IG change.

In general, the semi-automatic embodiments of system SYS afford machine-guided/assisted, but user-executed system positioning. This may be implemented in embodiment with haptic feedback, or directional compliance mode i.e. by restricting the possible trajectories of the system such that the user can easily change the imaging geometry from ROI_1 to ROI_2, e.g. with a single control. This keeps the user "in the loop" (which may be required by local safety regulations) and still achieves similar workflow benefits as the described automatic positioning.

For example, in embodiments the controller ISC can restrict the motion to the shortest/most direct trajectory from the current to the target imaging geometry, or at least cause more resistance to motion when the user operates the control user interface IG_UI so as to cause a diverging, wrong movement, away from the pre-determined trajectory.

In other embodiment the imaging system controller ISC causes through the control user interface IG-UI haptic feedback to guide the user to the shortest trajectory. The haptic feedback is modulated based on a distance in phase space between the current IG and the target IG, for instance vibrations of a lower intensity/frequency are effected when the user conforms to the pre-determined trajectory, and higher haptic intensity/frequency in case of trajectory divergence. In addition, a resistance in mechanical operability of movable part so the control user interface IG-UI (eg, the joystick) may be modulated by electro-mechanically engagement. For instance, the joystick IG-UI may be operable with less force when it effects a trajectory that conforms with the estimated imaging geometry change.

Reference is now made to FIG. 4 to explain in more detail aspects of the machine learning component MLC and its training in training phase.

Referring first back to the conceptual or virtual model MD as discussed above in connection with FIG. 2, the patient model M encodes implicitly one or several landmarks. Preferably the landmarks correspond to the center/centroids of organs frequently imaged during interventional X-ray imaging (such as the heart, the brain etc.), or the center of other landmarks such as vertebrae, with their associated positions identified relative to the origin of a two-dimensional (2D) or 3-dimensional (3D) coordinate system.

Conceptually, when using a machine learning approach as envisaged herein for estimating imaging geometry changes, the task may be formalized as follows. There is in general a latent mapping, which is unknown and presumably highly complex, that maps, for any patient ω, (current) imaging geometries for a current ROI_1 to another imaging geometry for another region of interest ROI_2.

This latent mapping may be formalized as:

$$L:(P,\omega) \rightarrow (P',\omega) \qquad (2)$$

This latent mapping does not operate merely on phase space, the space of all coordinates, but in a more abstract, augmented, space P×ω where patient characteristics ω adds other dimensions.

The collection of adapted parameters of the considered machine learning model, such as the weights in a neural-network model, may hence be considered an approximation of the above described latent mapping L.

Figure 2:
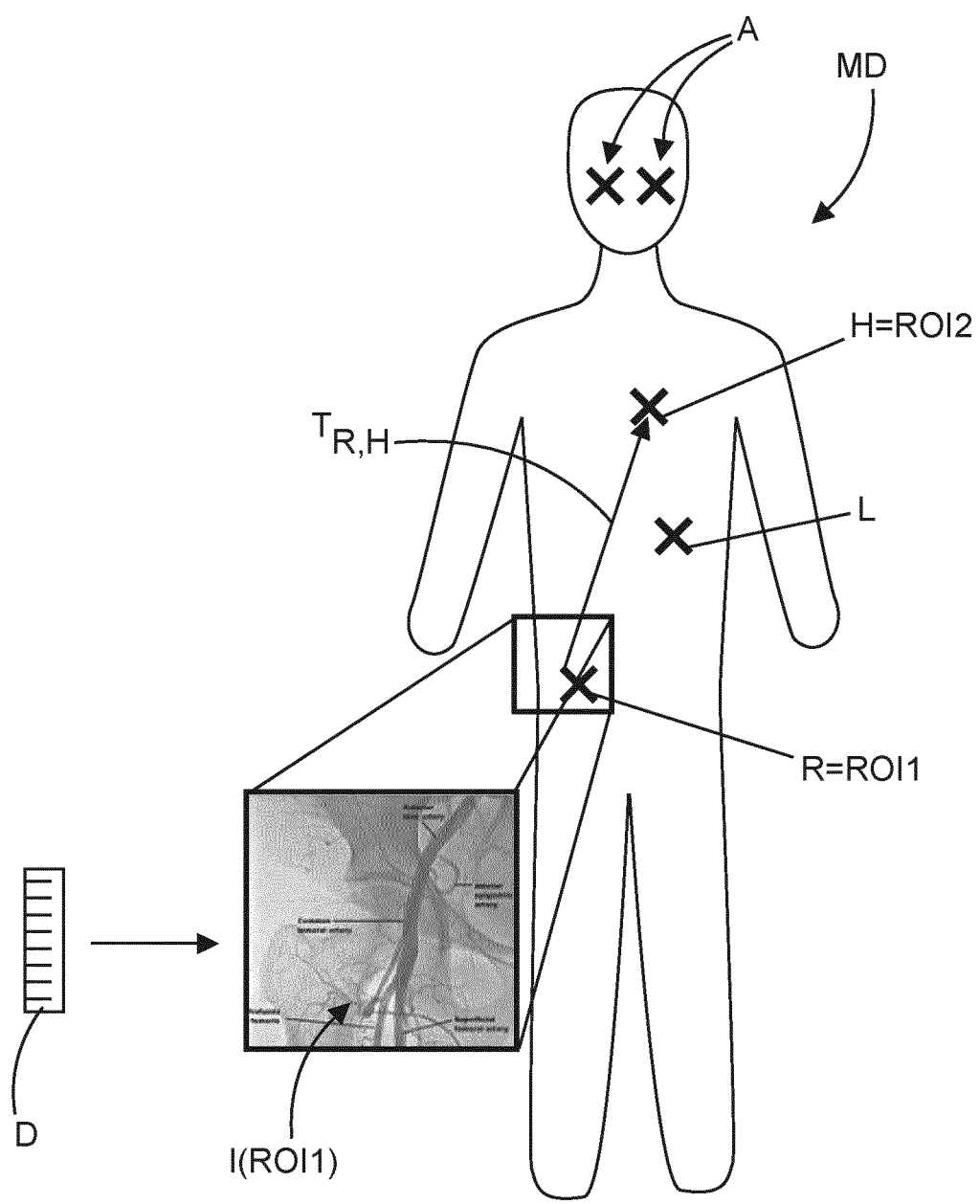
FIG. 2 is a virtual model representing spatial relationships between different landmarks.

In yet other words, the training data-based estimates of the parameters θ of the ML model M partially or approximately "encode" the virtual model MD shown in FIG. 2. No explicit co-ordinate formulation is required. The respective spatial relationship between the regions of interest across a population of considered patients ω is coded into the relationship of the learned parameters θ of the machine learning model.

The machine learning models mainly envisaged herein are of the regressional type where the input imagery, optionally augmented with non-image data such as imaging settings and or patient characteristics, is regressed into the associated imaging geometry change vectors $p_k$. However, other regression algorithms from "classical" statistics my potentially also be used although they are expected to provide a lesser degree of generalization than machine learning approaches that are based on training data.

Figure 4A:
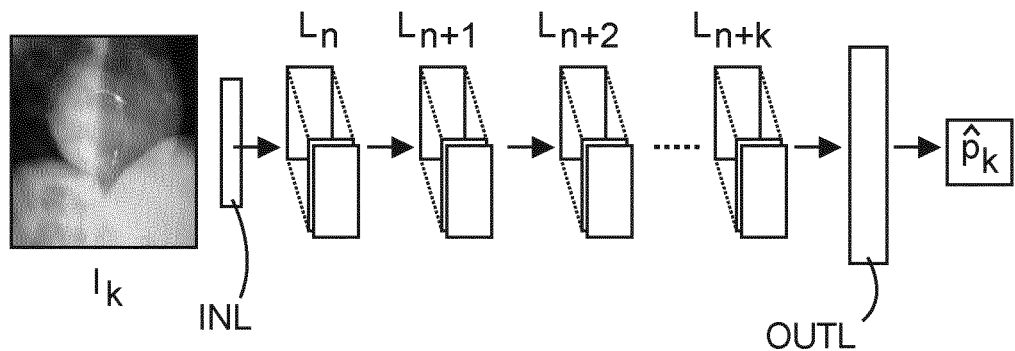
FIG. 4A shows a schematic diagram of a machine learning component.

As mentioned earlier, according to one embodiment the machine learning model M used has a neural-network (NN architecture), in particular a convolutional neural-network (CNN) architecture as shown in FIG. 4A, to which reference is now made.

Broadly, the NN structure of the machine learning component includes a plurality of nodes, at least partly interconnected and arranged in different layers. The layers are arranged in one or more sequences. Each node is an entry capable of assuming a value and/or can produce an output based on input it receives from one or more nodes of an earlier layer.

Each node is associated with a certain function which can be a simple scalar value (node weight) but can also be with more complex linear or non-linear functions. A "connection" between nodes in two different layers means that the node in the later layer can receive an input from the node in the earlier layer. If there is no connection defined between two nodes, no output of one of the two nodes can be received by the other node as input. The node produces its output by applying its function to the input. This can be implemented as a multiplication of the received input by the scalar value (the weight) of the node. The interconnected layered nodes with their weights, layer size etc forms a NN (neural network) model as one embodiment of the ML model envisaged herein. The model may be stored in a matrix or tensor structure in a memory. Once trained, this structure forms the trained machine learning component which can be held on one or more memories SM.

FIG. 4A is an exemplary embodiment of a suitable CNN configuration for inferring the imaging geometry change vector $p_k$ from a (live) input image $I_k$, or a sequence of such images. Model is preferably a deep neural network including one or more hidden layers. The layers Li are hidden layers as there are arranged between an input layer and an output layer. The network M consists of several convolutional filter layers $L_i$, some or each employing one, or a multitude of, convolutional filter kernels. Some or each of the convolutional filter layers are followed by an activation layer and in some embodiments, a pooling layer (not shown). Optionally, there is also one or both of a batch normalization and dropout layer. Further optionally, there are in addition one or several fully connected layers. The above mentioned series of layers terminates in a regressional layer producing the estimate of the (preferably normalized) vector $p_k$. Classification output is envisaged instead in some embodiments.

The activation layers determine the (typically non-linear) function with which output values from one layer are modified and provided as input to the next layer. The pooling layer combines outputs from multiple elements of one layer to serve as input to a single element in the next layer. Combined, each convolutional, activation and pooling layer serves to process data non-linearly, change its dimensionality, and pass it on to the next layer. The parameters of each of the convolutional layers are "learned" (optimized) in the training phase. The number of parameters in each convolutional layer depends on the size of the convolutional kernel, number of kernels, and the step size "stride" when moving over the image processed at a given layer. The number of parameters for fully connected layers is determined by the number of elements in the previous and current layers.

Optionally, additional input parameters $a_k$ are incorporated into the model to improve the accuracy and generalization ability of the model. These non-image parameters—usually categorical, sparsely represented data—can be represented by low-dimensional embeddings (e.g. one-hot encoding). For instance, such embeddings can be processed by one or more fully connected layers, and are then point-wisely added or concatenated to an arbitrary intermediate feature map (layer) by tiling the output from the one or more fully connected layer over the spatial dimensions of the feature map.

Once trained, during deployment, real data, such as a current live input image at a given ROI_1 acquired at a current image geometry $I_k$ [or $(I_k, a_k)$] is applied to an input layer INL. From the input layer INL, the image data $I_k$ propagates through application of the filters represented by the hidden layers $L_1$-$L_N$. The number or layers $L_1$-$L_N$ are two, three or much more in the order of tens (eg, 20-50 or other). The image data $I_k$ is transformed during the propagation to then emerge as a feature vector layer OUTL. The contextual data $a_k$ may be propagated through a different strand of the model (not shown) including one or more fully connected layers. The outputs of these two strands, the strand $L_1$-$L_N$ that processes the image data $I_k$ and the strand that processes the (possibly non-image) contextual data $a_k$ may be merged as will be explained later in more detail below with further reference to embeddings.

The feature vector layer OUTL could be considered as a low-dimensional 1D representation of input image $I_k$. The feature vector OUTL may then be followed by a single, or a plurality of, task-specific layers (not shown) such as fully connected or convolutional layers with an activation function (e.g. any one or more of linear, sigmoid, softmax, tangent hyperbolic) depending on the task. The task is a regression or a classification. The task specific layer(s) is/are applied to the feature vector layer OUTL to estimate, in embodiments to regress into, the imaging geometry change specification. The imaging geometry change specification is formalized herein as the desired final output $\hat{p}_k$. As mentioned earlier, instead of a regression task, a classification into directional qualifiers ("left", "right", etc) is produced.

One, more than one, or all hidden Layers $L_i$ are convolutional layers and their operation can be defined in terms of the filters. Convolutional layers as used in model M are to be distinguished from fully connected layers. In convolutional layers, each node is connected only to a sub-set of (pooled) nodes of the previous layer. The node in a follow-up layer is computed by forming a filter operation based on a sub selection of nodes from the previous layer. For different nodes of the follow-up layer, different sub-sets of the previous layer are processed, preferably with the same filter. The filter is a collection of numbers $f_{ij}$ arrangeable in a matrix. In some embodiments, the filter operation includes forming sums of products $f_{ij} \cdot n_{jk}$, $n_{jk}$ being a node of the previous layer. This sum-of-product operation is hence akin to traditional convolutional or filter operation where a filter mask is slid over matrix data. In general, the layers are implemented as matrices. The filter operations that implement the propagation of the data through the layers are implemented as matrix operations and are preferably run on GPUs or other processors capable of parallel processing such as those with multi-core designs. In fully connected layers, each node of the previous layer is connected to a node in the current layer using a learnable activation weight.

As mentioned above, fully connected layers are also envisaged herein for processing of non-image data $a_k$, such as bio-characteristics of the patients. The fully connected layers are envisaged to form a separate strand of processing layers (not shown) in which one, two or more of such fully connected layers are arranged in sequence and through which the non-image data $a_k$, is passed. Optionally, this data is also passed through a convolutional layer, separate and different from the above described convolutional layers for processing of the image. The output of this non-image data processing strand can then be fed into the image processing strand that is FIG. 4A. Specifically, the output of the last of those fully connected layers for non-imaging data can be concatenated to one of the hidden layers in the CNN branch of the model thereby merging non-image data with image data. In this way the output, that is the imaging geometry change, not only takes account for the spatial data in the image data but also the contextual data that provides more details on the patient thus making the model generalize better to different types of patients.

As mentioned, embeddings such as one-hot-encodings, can be used to represent categorical sparse data as vectors. The non-image data processing strands may include a combination of fully connected and convolutional layers. Also, the image-data processing strand as shown in FIG. 2 may include sequences of one or more fully connected layers, in particular when non-image data $a_k$, is jointly processed and passed through the layers as augmented data ($I_k$, $a_k$) In addition to convolutional layers and fully connected layers, either one or both strands may further include at any one or more of pooling layers, activation layers drop-out layers, in any combination. In addition, there may be deconvolutions layers that may be thought to represent an approximation of a reverse operation to the convolutional layers. The number of nodes produced at each layer may change in dimension, so size (number of rows and columns) and/or depth an output layer may grow or shrink. The dimension of the output of a convolutional layer is in general the same as the dimension of the input, or less, depending on the its "stride" which represent how many nodes the filter is slid past for each operation. Thus a down-sampling may occur. An up-sampling is also envisaged with deconvolutions layers. Some architectures include one or more runs of both, up-sampling layers followed by down-sampling or the other way around. In general, the architecture of FIG. 4A is a net down-sampling as the network acts as a mapping that maps the input image $I_k$ down to vector $\hat{p}_k$.

Figure 4B:
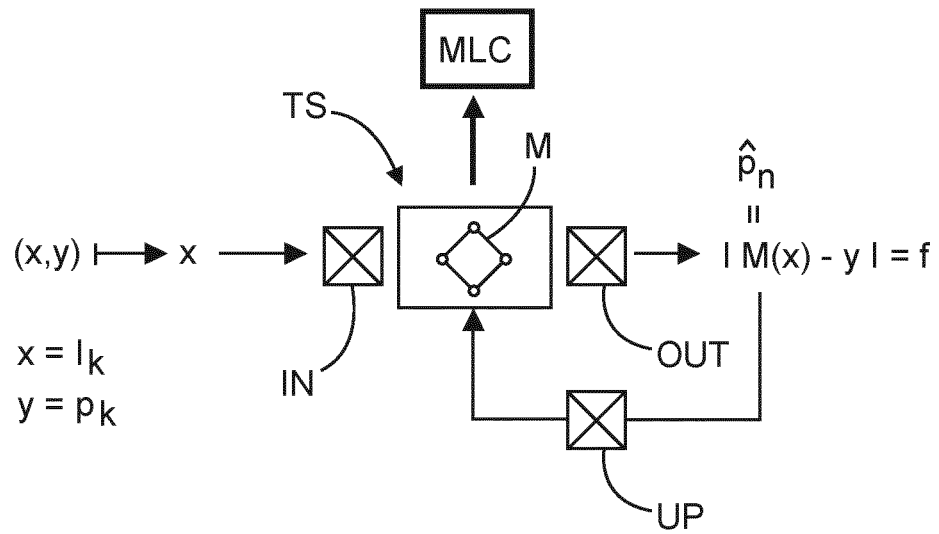
FIG. 4B is a computer-implemented training system for training a machine learning component.

Referring now to the training phase or process, this is implementable by a training system TS shown in FIG. 4B. The training is based on suitable training data. Training data can be obtained by acquiring real imagery or by obtaining simulated x-ray images, both denoted herein as $I_k$. Real X-ray imagery may be retrieved as historical image data from patient records such as PACS or from other image repositories.

In more detail, the training involves acquisition of real or simulated X-ray images $I_k$ ($k \in 1 \ldots K$), paired with a "ground truth" coordinate vector $p_k$ containing elements $\{p_{k,1}, \ldots p_{k,N}\}$ describing the images' position relative to one or several of the model landmarks using normalized coordinates. The number of elements N depends on the dimensionality of the model coordinate space (2D or 3D), the number of landmarks in the model, and the parametrization of the landmark positions. Typically, N ranges between 2 and 30, K is large (e.g. K>>30) and the images $I_k$ are selected from a large and variable subject population. Alternatively, the ground truth data $p_k$ is not expressed in terms of ROI pose coordinates, but is instead directly provided as image geometry (change) coordinates in terms of table translation, rotation/angulation of the C-arm gantry, or any other pose specification of the relevant imaging geometry component. The imaging geometry $p_k$ data may expressed as imaging geometry changes relative a given one of the ROIs or as absolute imaging geometry parameters for each ROI given a reference imaging geometry, such as "zero" angle/rotation, table at position/inclination "zero", etc.

The pairs $\{I_k, p_k\}$ are used in the training process, in which the images $I_k$ are provided as input to a convolutional neural network (CNN), and the network parameters are optimized to infer the coordinate vector $p_k$ as output. Optionally, the images can be paired with additional patient-specific parameter vectors $a_k$ (such as height, weight, age, gender, ethnicity, BMI, anatomical abnormalities, implanted devices, etc.) as input. One suitable CNN configuration for this task is the one shown in FIG. 4A but other architectures are envisaged herein and so are models other than NN such as support vector machines (SVM), decision trees, random forest and others.

With continued and more detailed reference to FIG. 4B, the computerized training system TS as may be used for training the machine learning model M based on training data (X Y)$^i$. "X" represents suitable imagery $I_k$ whilst "Y" represents the associated imaging geometry change $p_k$, also referred to herein as X's target, possibly augmented by image settings data EPX.

The training data pair can be obtained in a manual annotation exercise by a human expert. Alternatively and preferably, annotation is retrieved automated. The imaging geometry data and/or EPX data associated with given training image may be assembled from metadata such as DICOM header data or may be retrieved from patient records as held in databases. A suitably programmed scripting tool may be used to accomplish finding the associated imaging geometry change Y=$p_k$ for each image X=$I_k$.

The training data is thus organized in pairs i in particular for supervised learning schemes as mainly envisaged herein. However, it should be noted that non-supervised learning schemes are not excluded herein.

The machine learning model M, such as the shown CNN network in FIG. 4A or a hybrid network comprising CNN strands for processing image data $I_k$ and fully connected layer strands for processing of non-image data $a_k$ is chosen, and the weights are pre-populated with some initial, possibly random or uniform data. For instance, the weights for all nodes may all be populated by "1's" or other number.

The weights θ of the model M represent a parameterization M$^θ$, and it is the object of the training system TS to optimize and hence adapt the parameters θ based on the training data (X$^i$, Y$^i$) pairs. In other words, the learning can be formalized mathematically as an optimization scheme where a cost function is minimized although the dual formulation of maximizing the utility function may be used instead.

Assuming for now the paradigm of a cost function $f$, this measures the aggregated residue, that is, the error incurred between data estimated by the model M and the targets as per some or all of the training data pairs i:

$$\operatorname{argmin}_\theta f = \Sigma_i \|M^\theta(X^i) - Y^i\| \quad (3)$$

More specifically, the image data X of a training pair is propagated through the initialized network M. X for a first pair "i" is received at an input IN, passed through the model and then received at output OUT as output training data M$^θ$(X). A Suitable measure ∥·∥ used such as a p-norm, squared differences, or other, to measure the difference between the actual output M$^θ$(X) and the desired output Y.

The output training data M(X) is an estimate for the proposed imaging geometry change given the input training image data X. In general, there is an error between this output M(X) and the associated target Y of the presently considered pair. An optimization scheme such as backward/forward propagation or other gradient based methods may then be used to adapt the parameters θ of the model M$^θ$ so as to decrease the residue for the considered pair (X, Y)$^i$.

After one or more iterations in a first, inner, loop in which the parameters θ of the model are updated based on the optimization scheme used, the training system TS enters a second, an outer, loop where a next training data pair X$^{i+1}$, Y$^{i+1}$ is processed accordingly. This inner loop may be implemented by one or more forward and backward passes in the forward/backpropagation algorithm. However, this time while adapting the residue, it is not only the individual residue for the current pair that is adapted but the aggregated, summed, residues of all the training pairs considered up to this point in time are adapted if required to improve the objective function. The aggregated residue can be formed by configuring the objective function $f$ as a squared summed (or other algebraic combination) such as in eq (3) of some or all considered residues for each pair.

The generalized training system as shown in FIG. 4B can be considered for all learning schemes, in particular supervised schemes. Unsupervised learning schemes that perform suitable clusterings in phase space, augmented or not, may also be envisaged.

Figure 5A:
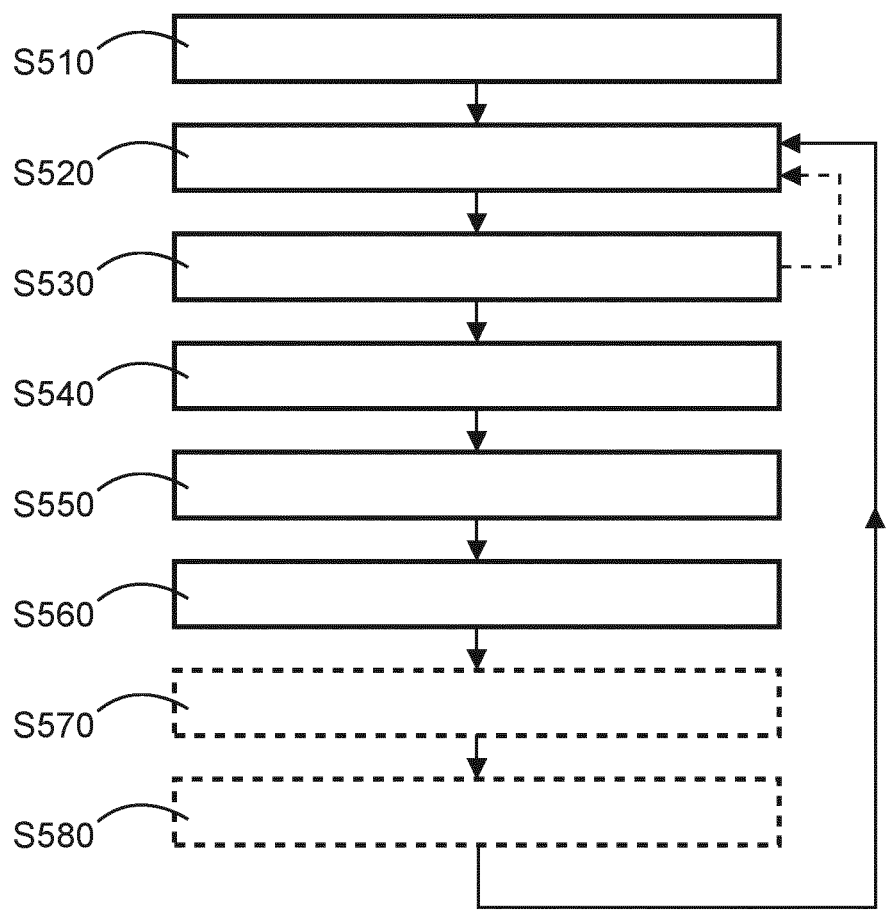
FIG. 5A is flow chart of a method of supporting an imaging operation.

Reference is now made to the flow chart in FIG. 5A to explain in more detail a method for supporting image based navigation. The method may be understood to underlie operation of the above mentioned image processing system SYS. However, it will be also understood that the method steps explained in FIG. 5A are not necessarily tied to the architecture of the image processing system SYS as described above in relation to FIGS. 1-4. More particularly, the method described below may be understood as teachings in their own right. The flow chart of FIG. 5A will be explained assuming that the machine learning model has been sufficiently trained, for instant as explained above at FIG. 4.

At step S510, a patient is positioned on an X-ray imaging table TB. At step S520 a first/next X-ray live image is obtained and received of a first ROI_1 at a first imaging geometry IG1, such as first table position.

At step S530, using a pre-trained machine leaning component such as the CNN at FIG. 4A above, the first/next X-ray image is processed to infer a required imaging geometry change (such as a relative table motion) from the current imaging geometry at ROI_1=R to a new imaging geometry IG2 for one or several other ROI_2=i or model landmark(s). This imaging geometry change may be represented by a geometrical transformation $T_{R,i}$ which is function of the two ROIs ROI_1=R and ROI_2=i.

At step S540, the required imaging geometry change is made available for further processing in form of a coordinate vector $p_k$ for example that specify angular or translational values, or both, for one or more imaging geometry components.

At step S550, the second (target) ROI, corresponding to any of the landmarks inferred by the CNN, is selected, either by the user, or automatically determined by the MLC based on context data such as a specification of the imaging protocol to be used. This selection step S550 of the second ROI ROI_2 can be performed alternately before step S530.

At an optional step S560, based on the MLC output and current table position, the relative table motion necessary to center the next image on the target ROI is calculated. This step may be required when the MLC output represents not the IG explicitly, but rather represents instead the new imaging geometry IG2.

At step S570 the imaging geometry change effected (such as table motion to the target) is effected automatically or semi-automatically or is otherwise facilitated. Embodiments includes automatic motion or assisted provisions such as visual or audio guidance, or mechanic feedback, eg with haptic assist or other forms of feedback. At optional step S580, any imaging settings (e.g. EPX) are automatically updated for the target ROI_2 as specified by a pre-defined look-up-table for example or as learned by the MLC.

It may be the case that imaging geometry changes have not been computed at step S530 for all relevant imaging geometry components. For example, at step S530 only the required table motion and/or C-arm translation has been computed, but not rotation/angulation of the C-arm. In this case there may then be an optional additional step in which the C-arm angles are adjusted as needed for the anticipated next imaging at the target ROI ROI_2. This may be by the user. In the alternative still, some imaging geometry changes, whilst computed, are not automatically effected such as the rotation/angulation of the X-arm. The adjustment is still done by the user manually through user interface IG-UI, but the system provides machine-assistance, eg through haptic, visual (video or image) or other signals/stimuli as described above in the various semi-automatic embodiments of system SYS.

Figure 5B:
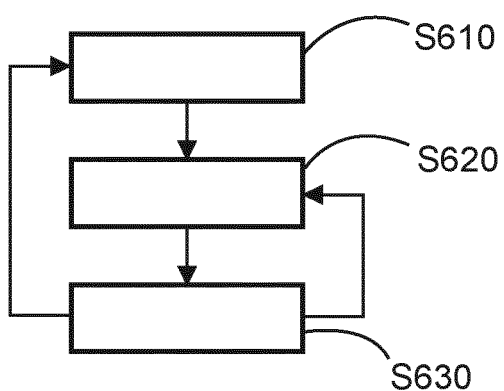
FIG. 5B is a flow chart of method of training a machine learning component.

Referring now the flow chart in FIG. 5B, this shows a computerized method for training a machine learning model MLC, in particular as explained above in FIGS. 4A, B. At step S610 training data is received in the form of pairs including imagery representing a particular region of interest and associated geometry changes for one or more other regions of interests.

At step S620 the imagery, and optionally non-image data including bio-characteristics of the patient represented in the image and or image settings, is applied to an initialized machine learning model M to produce an output.

A deviation of the output with the associated imaging geometry change is quantified by a cost function $f$. One or more parameters of the model are adapted at step S630 in one or more iterations in an inner loop, for instance to decrease the residue.

The training method then returns to step S610 where the next pair of training data is fed in to enter an outer loop. In step S620, the aggregated residues of all pairs considered up to that point are minimized.

More generally, the parameters of the model M are adjusted to improve an objective function which is either a cost function or a utility function.

Further Embodiments

The imaging geometry, and the imaging geometry change, has been described above with reference to the vector $p_k$ that represents points in phase space. This space is generally a high dimensional space and depends on the degree of freedom that is afforded by the imaging apparatus considered and/or the number of imaging geometry components it uses.

Whilst the machine learning model M can be trained to account for the whole imaging geometry across all of phase space, it may be on occasion desirable to restrict the estimation to certain sub-spaces of the phase space. Other imaging geometry parameters outside the sub-spaces are not estimated. The related imaging geometry component are adjusted by the user manually. More particularly, in embodiments pertaining to C-arm or U-arm imagers, the geometry change of interest is restricted only to table motion/tilting in either one or both of the spatial dimensions X,Y along its edges. Alternatively, is also changes in the angular values, that is, rotation and/or angulation of the C-arm that are of interest. Again, the same principle can be applied to other imaging modalities, so the principles disclosed herein are not necessarily tied to x-ray or C-arm based imagers.

In addition to the purely spatial aspect of the imaging geometry change, a dimension of phase-space can be augmented by adjoining imaging settings EPX parameters to points of the phase space. The machine learning model is then operated in this augmented, generalized phase space. Imaging settings EPX, can likewise be described by one or more vectors each entry representing a certain setting. The imaging settings relate to non-spatial characteristics of the interrogating imaging signal such as the energy of the x-ray beam or of the ultrasound beam or whatever the imaging modality that is being considered.

In particular, with reference to x-ray imaging, the image settings EXP include in particular tube voltage and/or tube current or other general settings of the x-ray tube. Other image settings EPX that are envisaged herein include frame rate settings and image processing parameters such as filtering and de-noising, mode of operation such as digital subtraction angiography (DSA) or single-exposure imaging.

Including the imaging settings in the learning allows the above described processing system to further estimate not only the imaging geometry change but also the changes to the imaging settings EPX. In other embodiments, however, the settings are adjusted manually by the user and it is only the full or partial imaging geometry that is estimated and, if desired, automatically effected.

As explained above, all landmarks or ROIs can be considered by one single machine learning component that is by one neural-network CNN. Coordinates of the estimated imaging geometry parameter vector $\hat{p}_k$ then encodes the respective imaging geometry changes in respect of some or each of the other ROIs, given the current ROI. However, in other embodiments a plurality of different machine learning models one dedicated to each particular landmark is formed. In other words, the models may be parameterized by the respective landmark ROI.

In addition or instead, a plurality of different machine learning models dedicated to different current image geometries may be provided. For example, one model may be used to work with all or a subset of ROIs imaged with the gantry in an anterior-posterior imaging direction, while another model may be used to work with ROIs imaged in a lateral view direction.

In addition or instead, in embodiments, the plurality of machine learning models may be parameterized by aspects of the imaging geometry itself. In other words, imaging geometry changes for a certain sub-space and phase space are considered parameterized by values of imaging geometry parameters in a different phase space. More specifically, a plurality of values may be used for instance to predict table motion parameterized on images with different C-arm angulations or rotations. In these models the user first chooses the respective angulation or rotation of the C-arm and then picks the corresponding machine learning model which then predicts the required table motion in either one or both of the spatial dimensions X, Y.

In another, more simplified embodiment with restricted estimation, the MLC(s) may estimate only a sub-set of imaging geometry changes in relation to sub-sect of landmark positions in the virtual FIG. 2 model. Additional landmark positions in the model are then obtained computationally cheaper for example by interpolation or extrapolation of nearby landmarks that are predicted by the MLC(s). The interpolation or extrapolation process can be driven by point-wise registration of the predicted landmark positions with the corresponding model landmarks.

Further to the image settings such as EPX settings these can be adjusted automatically or based on confirmation by the user through a suitable input user interface. The adjustment may be based on the patient pose estimate for the current or next imaging geometry.

Whilst in the above described embodiments it may be the user who chooses, given a current ROI, the next ROI, more refined embodiments are envisaged where it is the navigation SYS itself that predicts the next region of interest altogether given the current one based on the imaging protocol currently used. In other words, not only is the imaging change predicted but also which region of interest is likely to be considered next. The user can over-ride this ROI estimate, or confirm though an input user interface, in response of which the respective imaging geometry change is estimated.

In all of the above, the estimate of the imaging geometry change and the next region of interest can be used to effect the actual imaging geometry change by controlling the respective actuators. The imaging geometry change can be effected fully automatically without any user involvement. Alternatively and preferably, a graphical or other user interface allows the user to confirm the estimate and only then is the imaging geometry change effected by actuator control.

In embodiments, during an imaging procedure, the visited landmarks are stored or "buffered" in a memory. This buffering allows the user to quickly switch back between the previously visited region of interest without using the machine learning component. This allows saving time and energy as no computation through the MLC is required.

As mentioned earlier, the machine learning component encodes the model M for a distribution of poses of different landmarks across a population of subjects. It may occasionally happen that the imaging geometry estimate is not entirely accurate. This may happen for instance if a given patient does not fully fit to the previously considered population sample. In this case, a user interface, preferably graphical, of the system supports a functionality where the user can provide feedback on the actual pose of the landmark, such as the center of the heart, as compared to the imaging geometry change estimate (and hence, implicitly, of the pose). This corrective feedback can be used to improve the estimate for subsequent estimates e.g. by adding as an offset the difference between confirmed pose (eg, position) and the previously estimated position.

Whilst in the above embodiments it has been assumed that the imaging system includes actuators AC with encoders, non-encoded x-ray systems are also within the ambit of the present disclosure. Non-encoded actuator systems use actuators, motor-powered or manual, which do not track their respective positions or rotations. Such non-encoded actuators may be found in mobile x-ray systems for instance. For this type of imaging apparatuses with non-encoded actuators, the proposed system SYS may be trained to predict a classification rather than a regression into the imaging geometry change vector $p_k$. In other words, in these embodiments, the machine learning model M may be trained to estimate qualitative directional instructions of motion, hence a classification, such as "right", "left", "up", "down", etc. However, even in non-encoded systems, a regressional approach may still be used where the model M is trained to regress the input data into directional vectors such as a (unit) vector which represents a direction (eg, for table TB motion) to achieve the imaging geometry change. The unit vector may define an axis of rotation and direction of rotation.

The qualitative spatial instructions or the directional vector are preferably indicated to the user by display, by audio or video, or a combination thereof. For instance, assisted by the video, user can then operate the actuators to effect a respective motion or rotation of the imaging geometry components involved.

Whilst the above described systems can operate without acquisition of additional intervening fluoroscopic images during the imaging geometry change, such acquisition may still be beneficial for non-encoded x-ray systems in conjunction with directional instructions to be updated accordingly until the imaging geometry change is completed.

The above described principles can be used for x-ray imagers and non-x-ray imagers, but are particularly useful for x-ray guided intervention procedures including PCI, neuro-vascular interventions and peripheral vascular interventions amongst others.

It has been observed by Applicant that the estimated geometry change shows a remarkable accuracy across the board. Whilst the optional bio-metric non-image data $a_k$ may be used in embodiments together with input imagery, the fully trained system has been found to deliver usable estimates for the imaging geometry change estimate based on imagery only. It therefore seems that the image information in a certain image, local information that is, already encodes the proper spatial relationships for the patient globally to make accurate estimates for the imaging geometry change. In other words, the local spatial information in an image about spatial relations between the local anatomies is apparently already enough to reliably estimate the global spatial relationships for organs or regions of interest that are out of the current field of view. Even a relatively small field of view as used in interventional C-arm procedures is already sufficient for the system to be satisfactorily trained. Equally, it may be expected that the system's performance will improve if larger field of views are used.

One or more features disclosed herein may be configured or implemented as/with circuitry encoded within a computer-readable medium, and/or combinations thereof. Circuitry may include discrete and/or integrated circuitry, application specific integrated circuitry (ASIC), a programmed FPGA (field-programmable-gate-array), a system-on-a-chip (SOC), and combinations thereof, a machine, a computer system, a processor and memory, a computer program.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium (in particular, but not necessarily, a non-transitory medium), such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A system for supporting an imaging operation of an imaging apparatus capable of assuming different imaging geometries including a relative pose of a gantry and a table of the imaging apparatus, the system comprising:
   an input interface for receiving a current image acquired by the imaging apparatus of a current region of interest at a current imaging geometry;
   a processor configured to:
     based on pre-trained machine learning, compute output data that represents an imaging geometry change for a next imaging geometry in relation to a next region of interest; and
     instruct one or more actuators to cause the imaging apparatus to assume the next imaging geometry, wherein assuming the next imaging geometry comprises a change in the relative pose of the gantry and the table of the imaging apparatus, wherein the change in the relative pose of the gantry and the table of the imaging apparatus comprises a change in an orientation of at least one of the gantry and the table of the imaging apparatus; and an output interface for outputting a specification of the imaging geometry change.

2. The system of claim 1, further comprising a user interface configured to allow a user to specify the next region of interest.

3. The system of claim 1, further comprising a graphics generator for generating a visual indication of the specification on a display device.

4. The system of claim 1, wherein the imaging geometry further includes a state of a collimator of the imaging apparatus, and/or a distance between a detector of the imaging apparatus and an X-ray source.

5. The system of claim 1, wherein the processor is further configured to compute at least one of an image acquisition setting of the imaging apparatus associated with the next region of interest or the imaging operation.

6. The system of claim 1, wherein the pre-trained machine learning includes a neural network.

7. The system of claim 6, wherein the neural network is a convolutional neural network.

8. The system of claim 1, further comprising a second processor configured to train a machine learning model for supporting the imaging operation, the second processor configured to:
receive training input data including training imagery representing the region of interest and associated imaging geometry changes in relation to the one or more other regions of interest;
apply the training data to the machine learning model to obtain training output data; and
adapt parameters of the machine learning model based on the training output data.

9. The system of claim 8, wherein the machine learning model has a neural network architecture.

10. The system of claim 1, further comprising:
the imaging apparatus.

11. A method of supporting an imaging operation by an imaging apparatus capable of assuming different imaging geometries including a relative pose of a gantry and a table of the imaging apparatus, the method comprising:
receiving a current image acquired by the imaging apparatus of a current region of interest at a current imaging geometry;
computing, based on pre-trained machine learning, output data that represents an imaging geometry change for a next imaging geometry in relation to a next region of interest;
instructing one or more actuators to cause the imaging apparatus to assume the next imaging geometry, wherein assuming the next imaging geometry comprises a change in the relative pose of the gantry and the table of the imaging apparatus, wherein the change in the relative pose of the gantry and the table of the imaging apparatus comprises a change in an orientation of at least one of the gantry and the table of the imaging apparatus; and outputting a specification of the imaging geometry change.

12. The method of claim 11, further comprising training a machine learning model for supporting an imaging operation comprising:
receiving training input data including training imagery representing the region of interest and associated imaging geometry changes in relation to the one or more other regions of interest;
applying the training data to the machine learning model to obtain training output data; and
adapting parameters of the machine learning model based on the training output data.

13. The method of claim 11, further comprising receiving, from a user via a user interface, the next region of interest.

14. The method of claim 11, wherein the imaging geometry further includes a state of a collimator of the imaging apparatus, and/or a distance between a detector of the imaging apparatus and an X-ray source.

15. The method of claim 11, wherein the pre-trained machine learning includes a neural network.

16. The method of claim 15, wherein the neural network is a convolutional neural network.

17. A non-transitory computer readable medium having stored thereon a computer program comprising instructions which, when executed by a processor, cause the processor to:
receive a current image acquired by the imaging apparatus of a current region of interest at a current imaging geometry including a current relative pose of a gantry and a table of the imaging apparatus;
compute, based on pre-trained machine learning, output data that represents an imaging geometry change for a next imaging geometry in relation to a next region of interest;
instruct one or more actuators to cause the imaging apparatus to assume the next imaging geometry, wherein assuming the next imaging geometry comprises a change in the relative pose of the gantry and the table of the imaging apparatus, wherein the change in the relative pose of the gantry and the table of the imaging apparatus comprises a change in an orientation of at least one of the gantry and the table of the imaging apparatus; and
output a specification of the imaging geometry change.

18. The non-transitory computer readable medium of claim 17, wherein the processor is further configured to receive, from a user via a user interface, the next region of interest.

19. The non-transitory computer readable medium of claim 17, wherein the wherein the imaging geometry further includes a state of collimator of the imaging apparatus, and/or a distance between a detector of the imaging apparatus and an X-ray source.

20. The non-transitory computer readable medium of claim 17, wherein the pre-trained machine learning includes a neural network.

* * * * *